(12) United States Patent
Alekseeva et al.

(10) Patent No.: US 7,611,686 B2
(45) Date of Patent: Nov. 3, 2009

(54) MATERIALS PURIFICATION BY TREATMENT WITH HYDROGEN-BASED PLASMA

(75) Inventors: Anastasia Alekseeva, Moscow (RU); Kirill Kovnir, Dresden (DE); Pavel Chizhov, Moscow (RU); Michael Baitinger, Dresden (DE); Yuri Grin, Dresden (DE)

(73) Assignee: Max-Planck-Gesellschaft zur Forderung der Wissenschaften E.V., Munich (DE)

( * ) Notice: Subject to any disclaimer, the term of this patent is extended or adjusted under 35 U.S.C. 154(b) by 0 days.

(21) Appl. No.: 11/914,593

(22) PCT Filed: May 17, 2006

(86) PCT No.: PCT/EP2006/004692

§ 371 (c)(1),
(2), (4) Date: Jun. 27, 2008

(87) PCT Pub. No.: WO2006/122794

PCT Pub. Date: Nov. 23, 2006

(65) Prior Publication Data

US 2008/0311018 A1    Dec. 18, 2008

(30) Foreign Application Priority Data

May 17, 2005  (EP)  ................... 05010689
May 18, 2005  (EP)  ................... 05010789

(51) Int. Cl.
*B01D 53/32*        (2006.01)

(52) U.S. Cl. .............. 423/276; 423/277; 423/278; 423/298

(58) Field of Classification Search .......... 423/276, 423/277, 278, 298
See application file for complete search history.

(56) References Cited

U.S. PATENT DOCUMENTS

| 3,601,888 | A | * | 8/1971 | Engeler et al. ............... 438/547 |
| 3,723,290 | A | | 3/1973 | Hamblyn et al. |
| 3,783,167 | A | | 1/1974 | Tylko |
| 4,503,133 | A | * | 3/1985 | van Lier et al. .............. 429/174 |
| 4,548,688 | A | * | 10/1985 | Matthews ................. 430/281.1 |
| 4,849,164 | A | | 7/1989 | Jandeska et al. |
| 7,144,753 | B2 | * | 12/2006 | Swain et al. ................. 438/105 |
| 2002/0079802 | A1 | * | 6/2002 | Inoue et al. .................. 313/309 |
| 2008/0254601 | A1 | * | 10/2008 | Terry et al. ................. 438/502 |

FOREIGN PATENT DOCUMENTS

GB        1106011 A        3/1968

* cited by examiner

*Primary Examiner*—Roy King
*Assistant Examiner*—Xiaobei Wang
(74) *Attorney, Agent, or Firm*—Sutherland Asbill & Brennan LLP

(57) ABSTRACT

The present invention relates to a purification method for removing impurities containing oxygen from materials, especially boron, by hydrogen-based plasma treatment. The present procedure allows for efficient removal of oxygen while avoiding a thermal treatment that would substantially change the structure of the treated material, or a treatment leaving a reducing agent within the treated material.

19 Claims, No Drawings

MATERIALS PURIFICATION BY TREATMENT WITH HYDROGEN-BASED PLASMA

CROSS REFERENCE TO RELATED APPLICATIONS

This application claims the priority benefit of PCT/EP2006/004692filed on May 17, 2006 and European Application Nos. 05010689.7 and 05010789.5 filed on May 17, 2005 and May 18, 2005, respectively.

The present invention relates to a purification method for removing oxygen from materials.

Oxygen contamination of material represents a problem for a wide range of raw materials in science and industry. Removal or depleting of oxygen contamination often represent a problem or a task which can be overcome only heavily and under big efforts. These problems often are amplified by the essential character of oxygen impurities which are caused by absorption and/or reaction of raw materials with naturally abandoned $O_2$. Due to the presence of oxygen in air oxygen contaminations are practically all-pervasive. In addition to this, the removal of oxygen contaminations is often complicated by the formation of oxides of high stability.

Further common purification processes, e.g. based on the reduction of the corresponding oxides often lead to contamination of the material by the used reducing agent and/or to crucial microstructure changes.

On the other hand, the contamination of raw materials often prevent that the materials can be used for the purpose intended.

Therefore, the task of the subject invention was to provide a purification method for removing oxygen, in particular a procedure allowing to avoid a thermal treatment or a treatment leaving a reducing agent within the material.

According to the present invention this task was resolved by a purification method for removing oxygen from material wherein a material, containing oxygen impurities, is subjected to a treatment with hydrogen-based plasma. The procedure of the present invention consisting in the treatment with hydrogen-based plasma generally can be applied for all materials in order to remove impurities containing oxygen. Preferably a temperature stable material is used, in particular a material which distinctly does not evaporate at temperatures of $\leq 600°$ C., more preferably of $\leq 750°$ C., and most preferably of $\leq 950°$ C. and which is not subject to any other degradation process. Preferably the used materials are elements, in particular metals or non-metallic elements. However, also compounds consisting of more than one element can be purified by the present invention.

Especially preferred, the purification method of the invention is used for removing oxygen from boron, in particular from amorphous boron. Oxygen contamination of amorphous boron is especially difficult to remove and represents a serious problem. Industrial routes for producing amorphous boron usually include reduction of $B_2O_3$ by a suitable reducing agent. With such a treatment, an amorphous boron material is usually obtained in such a treatment which contains up to 4 mass-% of oxygen. This hinders the application of this material, e.g. for chemical preparations since in many fields of application it is necessary that the amorphous boron oxygen used is free or at least shows a minimally possible oxygen content.

Amorphous boron is often used for this purpose since it shows a considerably higher chemical reactivity in chemical reactions compared to crystalline boron. However, attempts to purify amorphous boron by any kind of thermal treatment leading to boron oxide evaporation result in crystallization of boron and thus the transformation of the amorphous boron to the undesired crystalline form.

Different from boron oxide $B_2O_3$, metals can mostly be cleaned from their oxides also in arbitrary stoves with hydrogen gas. For fine and reactive powders, however, which usually contain the greatest oxide contamination, these conventional cleaning methods lead to sintering of the fine powders. On the other hand, in the microwave plasma furnace even finest metal powders can be cleaned completely from their oxides within few minutes and without any changes of the particle size. Temperature control is made by use of a sufficiently short pulsed plasma. The power of the microwave furnace is always adjusted to the oxide properties and the grain size of the metal.

According to the invention, it is possible to remove oxygen from the materials, the materials keeping their original structure preferably in a complete form, however at least for more than 90 wt.-%, more preferably for more than 95 wt.-% of the material. According to the invention, amorphous boron can be released from oxygen and the obtained product is an oxygen-free boron or boron with reduced oxygen content whereas boron is still amorphous.

Basically, all materials, which contain oxygen impurities, can be purified by means of the process of the invention. Usually, materials are used as starting materials which have $\geq 1$ wt.-%, in particular $\geq 4$ wt.-% and preferably $\geq 10$ wt.-% of oxygen based on the total weight of the material. The oxygen impurity can be present as oxygen in a distributed form or also in a bonded form, especially in the form of oxides.

In the process of the invention it is possible to considerably reduce the amount of oxygen, especially to a content of $\leq 0.5$ wt. %, more preferably to a content of $\leq 0.1$ wt. %, preferably $\leq 0.05$ wt. %, and even more preferably $\leq 0.01$ wt.-% of oxygen based on the total weight of the material. The actual content of oxygen which is achieved, depends on the respective treatment conditions and can be adjusted by a skilled artisan depending on the desired final value.

As shown in the Examples, it is for example possible with the process of the invention to remove oxygen from amorphous boron up to a level of <0,1 mass % which was not possible with methods known to date.

According to the invention, the treatment of the starting material is effected by a hydrogen-based plasma. Such a plasma advantageously contains $\geq 5$ mass %, in particular $\geq 20$ mass %, preferably $\geq 50$ mass %, in particular $\geq 90$ mass %, preferably $\geq 99$ mass % and more preferably $\geq 99.5$ mass % of hydrogen, however, can also completely consist of hydrogen. For the production of plasma a gas atmosphere containing hydrogen and, if necessary, one or more inert gases having a desired pressure, is provided. The pressure is advantageously 0.1 to 100, especially 1 to 20 bar. Especially preferred, a pure hydrogen-based plasma or a plasma based on a mixture of hydrogen and at least one inert gas is selected from argon and nitrogen. The oxygen content in the plasma is preferably $\leq 10$ ppm, especially $\leq 5$ ppm, more preferably $\leq 1$ ppm and most preferably $\leq 0,6$ ppm. Advantageously, the oxygen content in the plasma is adjusted to 0.1 to 0.5 ppm. Further, the water content in the plasma advantageously is $\leq 10$ ppm, especially $\leq 5$ ppm, more preferably $\leq 1$ ppm and more preferably $\leq 0.1$ ppm.

The treatment with the hydrogen-based plasma can be carried out depending on the desired degree of removal of the oxygen for a variable duration, usually the duration between 0.5 to 10 h, especially between 2 and 5 h and often between 3 and 3.5 h are favourable.

The plasma treatment is preferably performed at a temperature from 700° C. to 1,500° C., in particular from 800° C. to 1,100° C.

Preferably, the hydrogen plasma used according to the invention is a microwave induced plasma. As a microwave radiation source an energy source having 100 to 2,000 W, especially 500 to 1,000 W at 1 to 10 Ghz, especially 2 to 3 Ghz can for example be used. H. radicals and H$^+$ ions, generated in a plasma, in particular in a microwave induced plasma are very active so that in principal any kind of material can be purified by performing the inventive procedure. Especially the H. radicals und H$^+$ ions are active enough to remove oxygen from amorphous boron which purification was not possible with methods of the state of the art so far by retaining the amorphous structure.

In a particular preferred embodiment oxygen is removed in the presence of an oxygen getter. The use of an oxygen getter greatly enhances the purification efficiency. While any oxygen getter material can be used especially good results have been achieved with titanium.

While not be wished to be bound to a series it is believed that the successful removing of oxygen according to the invention is promoted by the usage of a non-equilibrium procedure.

The method according to the invention allows to perform a purification from oxygen impurities without contaminating the material by any other agent. In particular no reduction agents which might remain in the material are needed. Further, no microstructure changes occur which means that the structure of the raw material is the same as the microstructure of the treated material. This allows for example to maintain amorphous boron and just remove oxygen impurities without transforming the amorphous microstructure into a crystalline microstructure.

The present invention is further elucidated by the following example.

EXAMPLE 1

About 0.2 g of amorphous boron (99,999% with respect of metals, 4.05±0.21 mass. % of oxygen by ICP analysis) was put in a cleaned and annealed alumina crucible, then located in a quartz ampoule together with an additional crucible, containing an oxygen getter (e.g. titanium). All described operations were performed in an argon-filled glove box with controlled atmosphere (<0.1 ppm $H_2O$, 0.1-0.6 ppm $O_2$). The ampoule was evacuated, filled by the desired gas to the definite pressure and then sealed. Filling gas composition was varied to find the best one for the purification. Pure argon and nitrogen plasma treatment do not change the oxygen content. Ar/$H_2$ based plasma (5% vol. of $H_2$) let to a reduction of oxygen content. The best results were achieved using pure hydrogen as the filling gas.

Experiments without oxygen getter also were performed. It was shown, that purification was greatly enhanced by the use of an oxygen getter. Samsung M1719N microwave (800 W, 2.45 GHz) was used as a microwave radiation source.

After the treatment, the ampoules were opened and then the probes for the chemical analysis were prepared in the glove box.

The best result (0.09±0.05 mass. % of oxygen after treatment) was achieved using $H_2$ plasma, Ti as a getter and a reaction time of about 3 to 3.5 hours.

Powder X-ray diffraction investigation revealed, that both starting material and plasma-treated product did not show sharp diffraction peaks and revealed only a wide intensity bump at a lower diffraction angles. This confirms the amorphous state of the material. Scanning electron microscopial observation revealed, that in the plasma-treated products the starting particles are sintered to larger conglomerates.

The invention claimed is:

1. A purification method for removing oxygen from a material comprising subjecting a material containing oxygen impurities to a treatment with a hydrogen-based plasma wherein the material is amorphous boron.

2. The method of claim 1, wherein an oxygen getter is present in the treatment.

3. The method of claim 2, wherein titanium is used as the oxygen getter.

4. The method of claim 1, wherein the amorphous boron to be purified is a temperature-stable material.

5. The method of claim 1, wherein the material to be purified contains oxygen impurities in an amount of $\geqq 1$ weight percent oxygen based on the total weight of the material.

6. The method of claim 1, wherein the oxygen impurities are present as oxides.

7. The method of claim 1, wherein the material is purified to an oxygen content of $\leqq 0.5$ wt. % oxygen based on the total weight of the material.

8. The method of claim 1, wherein the hydrogen-based plasma contains $\geqq 5$ vol. % $H_2$.

9. The method of claim 1, wherein a hydrogen-based plasma consisting of $H_2$ and optionally an inert gas such as argon or nitrogen is used.

10. The method of claim 1, wherein the hydrogen-based plasma contains <10 ppm $O_2$.

11. The method of claim 1, wherein the hydrogen-based plasma contains $\leqq 10$ ppm $H_2O$.

12. The method of claim 1, wherein the treatment with hydrogen-based plasma is performed for 0.5 to 10 h.

13. The method of claim 1, wherein a microwave-induced plasma is used.

14. The method of claim 1, wherein the material to be purified contains oxygen impurities in an amount of >4 weight percent oxygen based on the total weight of the material.

15. The method of claim 1, wherein the material to be purified contains oxygen impurities in an amount of >10 weight percent oxygen based on the total weight of the material.

16. The method of claim 1, wherein the material is purified to an oxygen content of $\leqq 0.1$ wt. % oxygen based on the total weight of the material.

17. The method of claim 1, wherein the material is purified to an oxygen content of <0.05 wt. % oxygen based on the total weight of the material.

18. The method of claim 1, wherein the hydrogen-based plasma contains $\geqq 90$ vol. % $H_2$.

19. The method of claim 1, wherein the hydrogen-based plasma contains $\geqq 99$ vol. % $H_2$.

* * * * *